W. J. LEWIS & H. W. OLIVER, Jr.
MANUFACTURING STRAP BOLTS.
No. 7,156. Reissued June 6, 1876.
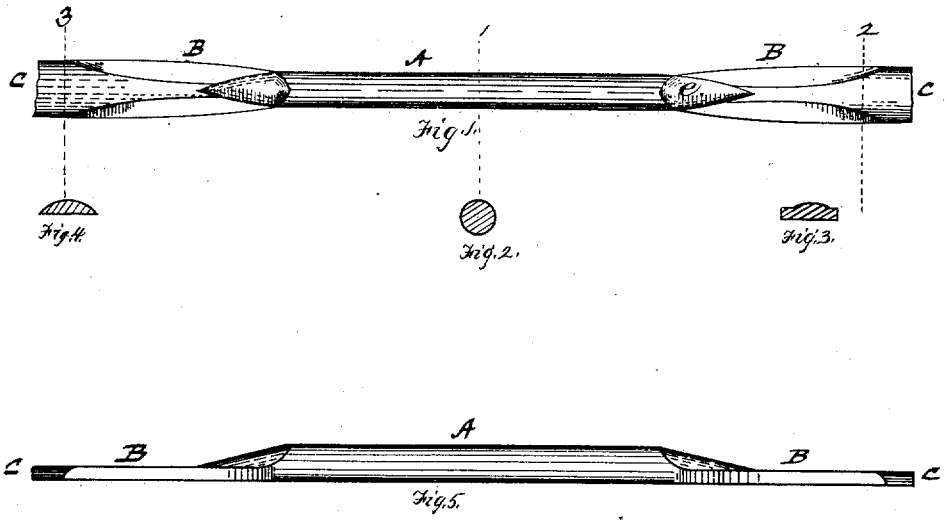
Witnesses.
James L. Kay
L. C. Fitter.
Inventor.
William J. Lewis
Henry W. Oliver Jr
by Bakewell & Kin
his attorneys
N. PETERS, PHOTO-LITHOGRAPHER, WASHINGTON, D. C.

UNITED STATES PATENT OFFICE

WILLIAM J. LEWIS AND HENRY W. OLIVER, JR., OF PITTSBURG, PA.

IMPROVEMENT IN THE MANUFACTURE OF STRAP-BOLTS.

Specification forming part of Letters Patent No. 82,725, dated October 6, 1868; reissue No. 7,156, dated June 6, 1876; application filed April 15, 1876.

*To all whom it may concern:*

Be it known that we, WILLIAM J. LEWIS and HENRY W. OLIVER, Jr., of Pittsburg, in the county of Allegheny and State of Pennsylvania, have invented a new and useful Improvement in Strap-Bolts; and we do hereby declare the following to be a full, clear, and exact description thereof, reference being had by letters to the accompanying drawing, which forms part of this specification.

Prior to our invention strap-bolts for wagon-boxes were formed by forging by hand. This method is objectionable for several reasons. It is slow and laborious. The straps produced are not uniform in finish. The labor and time required are so great that no saving is effected in proportioning the blank to secure the required strength in the various parts, so that a greater amount of metal than is necessary is left in the upper end.

Experience has demonstrated that the strap-bolt of a wagon-box is broken most frequently at the first rivet-hole, which is at or near the lower edge of the side of the box. The reason for this is, that the greatest strain comes at this point, such strain being produced by the swaying of the load against the box, causing the side of the latter to act as a lever operating against the lower rivet. This strain is greatly increased when the wagon is used with top boards, which increase the height of the sides from twelve to fourteen inches. To resist this strain it is necessary to have a greater body of metal in that part of the strap which is at the lower edge of the sides of the box, so that the formation of the rivet-hole therein will not weaken it to an injurious extent. The balance of the strap does not require so much metal, as there is but little strain upon it, and it may, therefore, be of smaller sectional area. As by our process we can draw the strap out to any desired degree of thinness without loss of time, we reduce the upper end, and thereby effect a large saving of material.

We mold, by rolling in properly-shaped rolls, round iron bars, of diameter equal to that required for the threaded portion or shank, to such form as to insure a greater amount of metal at that part of the strap portion upon which the greatest strain comes than in the balance of the strap, which is drawn out to effect the saving of material.

To enable others skilled in the art to understand our invention, we will now describe it by reference to the drawing, in which—

Figure 1 is a top view of a rolled bar, showing a series of strap-bolt blanks. Figs. 2, 3, and 4 are sections at 1, 2, and 3. Fig. 5 is a side view of a rolled bar, showing a series of strap-bolt blanks.

We form the bars by means of rolls, one of which is provided with a groove or grooves and recesses, which correspond in form and size to the form and size desired for the strap-bolts. Having one of the rolls thus provided with a groove or grooves and recesses, we take a round bar of iron as it comes from the ordinary rolls for forming "rounds," and while it is in a heated condition we pass it between the rolls provided with a groove or grooves and recesses, which correspond to the form desired for the strap-bolts, and thereby give to the bar the form shown and described, in which the part B, adjoining the round shank, has a thickness of metal reserved to it at the edges sufficient to resist the great strain at that point, it being the part at or near the bed-bottom, and the part C, not requiring the same provision, is drawn out into an oval form, whereby lightness, saving of metal, and beauty of finish are secured.

In constructing strap-bolts, the bars are cut in suitable lengths, which cutting must depend on the judgment and desire of the mechanic, for the length of the screw on the lower end of the strap-bolt and depth of the wagon-bed must be the guide for the lengths for cutting off the iron for the strap-bolt. The part marked A should, as a general rule, be cut or divided at the line marked 1. This part is provided, in the ordinary way, with screw-threads and screw-nut. The next point for cutting or dividing off the bar is in part marked C. The dividing-line in this part will depend entirely upon the depth of the wagon-bed, or other purpose to which it may be applied. The part marked B is made in the form represented, for the purpose of obtaining strength in that part of the strap-bolt against which the greatest force or strain is brought to bear, which is always near the bottom of the wagon-bed. The rib *e* on part B, and the general form of this part, as represented in the accompanying drawings, experience has proved to be the most desirable form for strength and neatness of finish.

The parts marked B and C are provided with screw or rivet holes at such points as suit the taste and judgment of the mechanic.

The advantage of rolling iron out into bars of the form herein described and represented will be very apparent to all who manufacture strap-bolts for wagon-beds. It saves the labor and expense of forging as now practiced. It makes a smooth and uniform strap-bolt, giving to the bolt always strength where it is most needed, and also neatness of finish.

Having thus described the nature, construction, and operation of our improvement, what we claim as our invention is—

Iron molded by rolling, of the form substantially as and for the purpose herein described.

In witness whereof we, the said WILLIAM J. LEWIS and HENRY W. OLIVER, Jr., have hereunto set our hands.

WILLIAM J. LEWIS.
HENRY W. OLIVER, JR.

Witnesses:
T. B. KERR,
JAMES I. KAY.